United States Patent [19]

Crano

[11] Patent Number: 5,084,529
[45] Date of Patent: Jan. 28, 1992

[54] POLYOL(ALLYL CARBONATE) COMPOSITION

[75] Inventor: John C. Crano, Akron, Ohio
[73] Assignee: PPG Industries, Inc., Pittsburgh, Pa.
[21] Appl. No.: 347,539
[22] Filed: May 4, 1989
[51] Int. Cl.⁵ ............................................. C08L 75/04
[52] U.S. Cl. ....................................... 525/455; 525/920
[58] Field of Search ................................ 525/455, 920

[56] References Cited
U.S. PATENT DOCUMENTS

| | | | |
|---|---|---|---|
| 4,054,162 | 10/1987 | Kriog et al. ................ | 260/45.9 KB |
| 4,360,653 | 11/1982 | Stevens et al. ............... | 526/301 |
| 4,565,648 | 1/1986 | Kopp et al. .................. | 252/397 |

Primary Examiner—Ana L. Carrillo
Attorney, Agent, or Firm—Irwin M. Stein

[57] ABSTRACT

Polyol(allyl carbonate) compositions and polymerizates thereof that have an enhanced resistance to yellowing on exposure to external heating are described. In particular, a polyol(allyl carbonate) composition comprising (a) from about 55 to about 90 weight percent of a polyol(allyl carbonate), e.g., diethylene glycol bis(allyl carbonate), from about 10 to about 40 weight percent of aliphatic polyurethan having terminal ethylenic unsaturation, e.g., an aliphatic polyesterurethan diacrylate, and from about 0 to about 5 weight percent of a difunctional monomer selected from the group consisting of allyl methacrylate and allyl acrylate and (b) from about 0.01 to about 0.5 weight percent of a dialkyl pyrocarbonate, e.g., diethyl pyrocarbonate, based on the weight of the polymerizable reactants is described. Polymerizates of such polyol(allyl carbonate) compositions have an enhanced resistance to yellowing when heated at elevated temperatures, e.g., 130° C.

20 Claims, No Drawings

POLYOL(ALLYL CARBONATE) COMPOSITION

BACKGROUND OF THE INVENTION

The present invention relates to certain polymerizable polyol(allyl carbonate) compositions and to polymerizates prepared from such compositions. Such polymerizates, e.g., articles such as optical lenses, are characterized by an improved resistance to yellowing when heated at elevated temperatures, e.g., at temperatures in the range of from about 80° C. to about 180° C.

Polymerizates prepared from aliphatic polyol(allyl carbonate) monomers, e.g., diethylene glycol bis(allyl carbonate) are characterized by hardness, impact resistance and optical clarity. For these reasons, optical articles, e.g., lenses, have been prepared from such polymerizates. Moreover, such lenses offer a weight advantage, vis a vis, glass lenses. It has also been proposed to prepare photochromic articles from such polymerizates. Frequently, photochromic articles are prepared by imbibing a photochromic substance within the preformed polymerizate, e.g., by immersion of the polymerizate in a hot solution containing the photochromic substance or by other thermal transfer mechanisms described in the art. It is also common to tint or dye such polymerizates (with or without the added photochromic substance) by immersion of the polymerizate in a heated aqueous dispersion of the selected dye.

When subjected to heat aging or heat treatments, such as those involved in tinting of the polymerizate or imbibition of a photochromic substance by thermal transfer, polymerizates prepared from polyol (allyl carbonate) compositions containing an aliphatic polyurethane, tend to take on a slight yellow cast. Such yellowing may adversely affect the commercial utility of such polymerizates, particularly in optical applications, and may, if significant, adversely affect the optical transparency and clarity of articles prepared from such polymerizates. There is, therefore, a continuing need for materials that are compatible with the polymerizable polyol(allyl carbonate) monomer composition and polymerizates prepared therefrom, which will prevent or mitigate yellowing of the polymerizate caused by heating at elevated temperatures, e.g. temperatures that may be used during post treatment of a pre-formed polymerizate. Such post treatment temperatures may range from about 80° C. to about 180° C., customarily from about 100° C. to about 150° C., e.g., 130° C.

It has now been discovered that the addition of small amounts of a diakyl pyrocarbonate to a polymerizable polyol(allyl carbonate) monomer composition containing an aliphatic polyurethane component provides a polymerizate that exhibits enhanced resistance to yellowing caused by post formation heating.

DETAILED DESCRIPTION OF THE INVENTION

Dialkyl pyrocarbonates that may be used to enhance resistance to yellowing of polymerizates prepared from polyol(allyl carbonate) monomer compositions containing an aliphatic polyurethan component may be represented by the graphic formula:

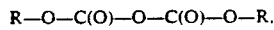

wherein R is selected from the group consisting of $C_1$–$C_{12}$ alkyl and $C_6$–$C_{10}$ cycloalkyl. More particularly, R is selected from the group consisting of $C_2$–$C_4$ alkyl, such as ethyl, propyl and tertiary butyl. As used in the description and claims, the term "alkyl" when referring to dialkyl pyrocarbonates is intended to mean and include both linear and branched chain alkyls as well as cycloalkyl groups, e.g., cyclohexyl and tertiary butyl cyclohexyl.

Suitable examples of dialkyl pyrocarbonates that may be used with polyol(allyl carbonate) compositions include: dimethyl pyrocarbonate, diethyl pyrocarbonate, diisopropyl pyrocarbonate, di-n-propyl pyrocarbonate, di-n-butyl pyrocarbonate, di-isobutyl pyrocarbonate, di-secondary butyl pyrocarbonate, di-tertiary butyl pyrocarbonate, di-pentyl pyrocarbonate, di-hexyl pyrocarbonate, di-heptyl pyrocarbonate, di-2-ethylhexyl pyrocarbonate, di-nonyl pyrocarbonate, di-decyl pyrocarbonate, di-dodecyl pyrocarbonate, di-cyclohexyl pyrocarbonate and di-4-tertiary butyl cyclohexyl pyrocarbonate. Economically preferred are diethyl pyrocarbonate, diisopropyl pyrocarbonate and di-tertiary butyl pyrocarbonate.

The dialkyl pyrocarbonates may be prepared by reacting alkali metal alkyl carbonate, e.g., sodium ethyl carbonate, with alkyl halocarbonate, e.g., ethyl chlorocarbonate (ethyl chloroformate). The alkyl groups of the alkyl carbonate and halocarbonate are chosen to correspond to the alkyl group desired for the pyrocarbonate. For example, sodium ethoxide, which can be prepared by dissolving sodium metal in toluene solution of ethyl alcohol, is carbonated with carbon dioxide to prepare sodium ethyl carbonate. Thereafter, the sodium ethyl carbonate is reacted with ethyl chloroformate to form diethyl pyrocarbonate and sodium chloride. The chloride salt is filtered and the pyrocarbonate recovered by distillation.

Dialkyl pyrocarbonates may also be prepared by reacting alkyl halocarbonate, e.g., ethyl chloroformate, with sodium hydroxide in the presence of a catalyst of a tertiary amine or quaternization product thereof having at least one omega-hydroxyalkyl, omega-hydroxyalkyl ether, or omega-hydroxyalkyl polyether group connected to the nitrogen atom. See, for example, Example 6 of U.S. Pat. No. 3,326,958.

In a preferred embodiment, the dialkyl pyrocarbonate incorporated into the polymerizable polyol(allyl carbonate) composition is a colorless material that is soluble in the polyol(allyl carbonate) monomer composition. More preferably, the dialkyl pyrocarbonate is a liquid that can be readily poured and admixed with the polymerizable components of the polyol(allyl carbonate) composition.

The amount of dialkyl pyrocarbonate incorporated into the polymerizable polyol(allyl carbonate) composition may vary. Only that amount which is sufficient to enhance the resistance to yellowing from externally applied heat of polymerizates prepared from such compositions is required. Such amount may be referred to as a heat-stabilizing amount and typically will range from about 0.01 to about 0.5 weight percent, based on the weight of the polymerizable components of the polymerizable polyol(allyl carbonate) composition. More particularly, the amount of dialkyl pyrocarbonate used may range from about 0.05 to about 0.15, e.g., 0.10, weight percent. The aforesaid amount of dialkyl pyrocarbonate is incorporated into the polymerizable liquid polyol(allyl carbonate) composition by admixing the selected amount with mild agitation until the pyrocarbonate is dissolved in the polymerizable composition.

Polymerizable polyol(allyl carbonate) compositions to which are added the aforedescribed dialkyl pyrocarbonate include liquid blends of copolymerizable monomeric materials; e.g., polyol(allyl carbonate) monomer, aliphatic polyurethan having ethylenic unsaturation at its terminal ends, and optionally a difunctional monomer selected from the group consisting of allyl methacrylate and allyl acrylate. More particularly, the polymerizable polyol(allyl carbonate) monomer represents from about 55 to about 90 weight percent, preferably from about 60 to about 80, e.g., about 70, weight percent of the copolymerizable composition.

Polyol(allyl carbonate) monomers that may be used in the aforedescribed polymerizable composition are allyl carbonates of linear or branched aliphatic or aromatic liquid polyols, e.g., aliphatic glycol bis(allyl carbonate) compounds, or alkylidene bisphenol bis(allyl carbonate) compounds. These momomers may be described as unsaturated polycarbonates of polyols, e.g., glycols. The monomers may be prepared by procedures well known in the art, e.g., as described in U.S. Pat. Nos. 2,370,567 and 2,403,113.

Polyol(allyl carbonate) monomers may be represented by the graphic formula:

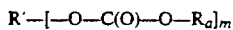

$$R'-[-O-C(O)-O-R_a]_m \qquad I$$

wherein $R_a$ is the radical derived from an unsaturated alcohol and is commonly an allyl or substituted allyl group, R' is the radical derived from the polyol and m is a whole number from 2-5, preferably 2, that depends on the number of hydroxy groups in the polyol. The allyl group may be substituted at the 2-position with a halogen, most notably chlorine or bromine, or an alkyl group containing from 1 to 4 carbon atoms. Generally the alkyl substituent is a methyl or ethyl group. The allyl group may be represented by the graphic formula:

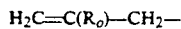

$$H_2C=C(R_o)-CH_2- \qquad II$$

wherein $R_o$ is hydrogen, halogen or a $C_1-C_4$ alkyl group. Most commonly, $R_a$ is the allyl group, $H_2C=CH-CH_2-$.

R' is a polyvalent radical derived from the polyol which can be an aliphatic or aromatic polyol that contains 2, 3, 4 or 5 hydroxy groups. Typically, the polyol contains 2 hydroxy group, i.e., a glycol or bisphenol. The aliphatic polyol may be linear or branched and contain from 2 to 10 carbon atoms. Commonly, the aliphatic polyol is an alkylene glycol having from 2 to 4 carbons atoms or poly($C_2-C_4$) alkylene glycol, e.g., ethylene glycol, propylene glycol, trimethylene glycol, tetramethylene glycol, or diethylene glycol, triethylene glycol, etc.

Specific examples of polyol(allyl carbonate) monomers include ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate). Diethylene glycol bis(allyl carbonate) is the preferred polyol(allyl carbonate) monomer.

A detailed description of polyol(allyl carbonate) monomers that may be used to form the polyol(allyl carbonate) composition of the present invention are described in U.S. Pat. No. 4,637,698 at column 3, line 33 through column 5, line 61. That disclosure is hereby incorporated by reference and is summarized above. As used in the present description and claims, the term polyol(allyl carbonate) monomer or like names, e.g., diethylene glycol bis(allyl carbonate), are intended to means and include the named monomer or prepolymers thereof and any related monomers species contained therein.

The polyol(allyl carbonate) composition of the present invention may contain from about 10 to about 40 weight percent of an aliphatic polyurethan having terminal ethylenic unsaturation, e.g., an aliphatic polyurethan diacrylate or triacrylate. In a preferred embodiment of the present invention, the composition contains from about 20 to about 30 weight percent of the aliphatic polyurethan, which may be represented by the expression:

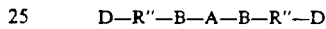

$$D-R''-B-A-B-R''-D \qquad III$$

wherein D represents the terminal functional group containing ethylenic unsaturation, R'' represents a bivalent alkylene group containing from 1 to about 10 carbon atoms, B represents an aliphatic biscarbamate moiety originating from the corresponding aliphatic diisocyanate, and A represents the residue of a saturated aliphatic polyol, e.g., a diol such as a $C_2-C_6$ alkane diol, a polyether diol, a polycarbonate, diol or a polyester diol. Preferably, A is a polyester diol. The polyurethan should form a homogeneous mixture in and be copolymerizable with the polyol(allyl carbonate), e.g., diethylene glycol bis(allyl carbonate), with which it is blended.

The terminal functional group containing ethylenic unsaturation (D) is typically selected from members of the group acrylate, methacrylate, allyl carbamate and allyl carbonate. The acrylate and methacrylate functional groups may be represented by the formula, $CH_2=C(R_1)-C(O)O-$, wherein $R_1$ is hydrogen or methyl. The allyl carbamates and carbonates may be represented by the formulae, $CH_2=CH-CH_2-NH-C(O)O-$, and $CH_2=CH-CH_2-O-C(O)O-$, respectively.

The group R'' in formula III represents a bivalent $C_1-C_{10}$ alkylene, including branched and straight chain alkylenes. Most commonly, R'' is a bivalent $C_2-C_4$ alkylene, e.g., ethylene ($-CH_2CH_2-$).

Diisocyanates that may be used to prepare the aliphatic polyurethan component of the polyol(allyl carbonate) composition are aliphatic diisocyanates and cycloaliphatic diisocyanates. For convenience and brevity, such isocyanates will be referred to collectively as aliphatic diisocyanates. Such materials are substantially free of aromatic moieties. By substantially free of aromatic moieties is meant that the aliphatic diisocyanate (and thus the aliphatic polyurethan component) contains 1 percent or less of aromatic diisocyanate groups. Examples of suitable diisocyanates include 1,6-hexamethylene diisocyanate, 1,4-tetramethylene diisocyanate and 1,10-decamethylene diisocyanate, 4,4'-methylene-bis(cyclohexyl isocyanate), 4,4'-methylene-bis(3-methyl cyclohexyl isocyanate), hydrogenated toluene diisocyanate (including hydrogenated products of:

(a) the 2,4-isomer, (b) the 2,6-isomer, (c) the 80/20-2,4/2,6-isomer mixture and (d) the 65/35-2,4/2,6-isomer mixture), 4,4'-isopropylidene-bis(cyclohexyl isocyanate), 1,4-cyclohexane diisocyanate, 4,4'-dicyclohexyl diisocyanate, 2,4'-dicyclohexyl diisocyanate and isophorone diisocyanate. The group B in formula III may originate from such aliphatic diisocyanates.

In formula III, A represents the residue of a saturated aliphatic diol, such as alkane diols containing from 2 to 6, e.g., 2 to 4, carbon atoms, polyether diols, polycarbonate diols and polyester diols.

Polyester diols may be prepared by techniques well-known in the art, e.g., using saturated dicarboxylic acids or anhydrides thereof (or combination of acids and anhydrides) and polyhydric alcohols, or by ring opening of caprolactones, e.g., epsilon caprolactone. Such polyester diols and their manner of preparation are well known and are fully described in the published literature. Many are commercially available in various molecular weights. Aliphatic dicarboxylic acids suitable for preparing polyesters are those containing from about 4 to about 14, preferably from about 6 to about 10, carbon atoms inclusive. Examples of such dicarboxylic acids include: succinic acid, glutaric acid, adipic acid, pimelic acid, suberic acid, azelaic acid and sebacic acid. Corresponding anhydrides can also be used. Typically, adipic and azelaic acids are used.

The polyhydric alcohols used in the preparation of polyester diols are typically aliphatic alcohols containing at least 2 hydroxy groups, e.g., straight chain glycols containing from 2 to 15, preferably from 4 to 8, carbon atoms inclusive. More preferably, the aliphatic alcohols contain only 2 hydroxy groups. The glycols contain hydroxyl groups preferably in the terminal positions. Examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In preparing the polyester diol, the dicarboxylic acid (or anhydride thereof) is reacted with the polyhydric alcohol usually in the presence of a small amount of esterification catalyst, such as a conventional organo tin catalyst. The amount of acid and alcohol used will vary and depend on the molecular weight polyester desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4-butylene sebacate) and poly(epsilon caprolactone). Polyester diols contemplated for use may have a weight average molecular weight from about 500 to about 3000, e.g., from about 500 to 2500, more particularly from about 900 to about 1300.

Polycarbonate diols that may be used to prepare the aliphatic polyurethan component of the polyol (allyl carbonate) composition may have weight average molecular weights ranging from about 500 to about 5000, e.g., 550 to 3300, more particularly from 750 to 1500, as determined by hydroxyl end group analysis. Aliphatic polycarbonate diols are described in U.S. Pat. Nos. 3,248,414, 3,248,415, 3,248,416, 3,186,961, 3,215,668, 3,764,457 and 4,160,853. Such hydroxy-terminated polycarbonates may be prepared from (1) carbon dioxide and 1,2-epoxides, (2) cyclic carbonates, such as ethylene carbonate, or (3) from cyclic carbonates and 1,2-epoxides by methods known in the art. Polycarbonate diols may also be prepared by reacting aliphatic diols with bischloroformates of aliphatic diols in the presence of inert solvents and acid acceptors, e.g., tertiary amines. In addition, polycarbonate diols may be prepared from glycols, such as ethylene glycol, propylene glycol and diethylene glycol, and dialkyl carbonates, such as diethyl carbonate and dimethyl carbonate, by a transesterification reaction.

In particular, U.S. Pat. No. 4,160,853 describes the synthesis of aliphatic polycarbonate diols by the reaction of an aliphatic diol and a dialkyl carbonate in the presence of a titanium catalyst. The reaction sequence may be depicted by the following equation:

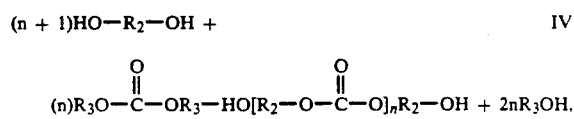

wherein n is a number from 4 to 46, $R_2$ is an aliphatic group (linear or cycloaliphatic) containing from 4 to about 10 carbon atoms, and $R_3$ is a lower alkyl group containing 1 to 4 carbon atoms. Preferred aliphatic diols include: 1,4-butane diol, and 1,6-hexane diol. Diethylcarbonate is a preferred dialkyl carbonate. The preferred catalysts are tetra-alkyl esters of titanium, particularly, tetrabutyl titanate. The disclosures of the aforedescribed patents relating to the preparation of aliphatic polycarbonate diols are hereby incorporated by reference.

Polyether diols, e.g., poly(oxyethylene)glycols, poly(oxy-1,2-propylene)glycols, and poly(oxy-1,4-butylene)glycol, that may be used to prepare the aliphatic polyurethan component of the polyol(allyl carbonate) composition may also vary in molecular weight. Poly(oxyethylene)glycols may range in molecular weight from about 200–4000, more particularly, 750–3300, e.g., 1000–2800. Liquid poly(oxyethylene)glycols having molecular weights of below about 750, as determined by hydroxyl end group analysis, are particularly contemplated. Poly(oxyethylene)glycols may be prepared by reaction of ethylene oxide with water or ethylene glycol in the presence of a catalytic amount of a Lewis acid at 50°–70° C. or Lewis base at 120°–200° C.

Poly(oxypropylene)glycols may be prepared in a manner similar to poly(oxyethylene)glycols. Molecular weights of the poly(oxypropylene)-glycols that may be used to prepare the polyol(allyl carbonate) composition may vary from about 400 to about 4000, e.g., 400 to about 2000, or 400 to about 1200, as determined by hydroxyl end group analysis. Liquid poly(oxypropylene)glycols are particularly contemplated.

In addition, block and random hydroxyl terminated copolymers of ethylene oxide and propylene oxide may be used. Further, polyether diols prepared from 1,2-butylene oxide, i.e., poly(oxy-1,2-butylene)glycol, and tetrahydrofuran are also contemplated. Alkane diols contemplated for use in preparing the polymerizable polyol (allyl carbonate) composition are alkane diols containing from 2 to 6 carbon atoms, e.g., ethylene glycol, propylene glycol, 1,4-butane diol, 1,5-pentane diol and 1,6-hexane diol. Preferably, the alkane diols contain terminal hydroxy groups.

The aliphatic polyurethan may be prepared by methods well documented in the literature and known to those skilled in the art, e.g., by reacting an excess of the aliphatic diisocyanate with the saturated aliphatic diol, e.g., polyester diol, thereby to form the corresponding urethane having terminal isocyanate functionality. Thereafter, the resulting urethane diisocyanate may be reacted with a material having acrylic (or allylic) and hydroxyl functionality, e.g., a monoacrylate of a diol, e.g., 2-hydroxyethyl acrylate, to prepare the aliphatic urethan having terminal functional groups containing ethylenic unsaturation. As used herein, the phrase "containing terminal ethylenic unsaturation" with respect to the aliphatic polyurethan means that each terminal end of the urethane contains a functional group containing ethylenic unsaturation, e.g., an acrylate functional group. Diacrylate-terminated polyester-based polyurethans are commercially available in various molecular weights. Of particular utility is the commercial polyesterurethan, Uvithane ® 893 urethane diacrylate.

Polyesterurethans containing terminal acrylate functionality may be further depicted by the following graphic formula:

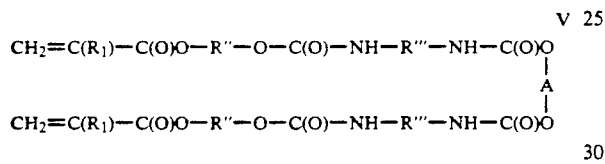

V wherein $R_1$ and $R''$ have the same meaning as described hereinabove, A is the residue of the polyester diol, and $R'''$ is the hydrocarbon portion of the aliphatic diisocyanate. Polyesterurethans having terminal allyl carbamate or allyl carbonate groups may be depicted similarly by substituting the allyl carbamate or allyl carbonate group for the acrylate functional group in graphic formula V, i.e., for the $CH_2=C(R_1)-C(O)O-$ group.

In a further embodiment, a difunctional monomer that is capable of enhancing cross-linking of the polyol(allyl carbonate) and aliphatic polyurethan components of the polymerizable composition is incorporated in such composition. The addition of the difunctional monomer enhances development of a three-dimensional cross-linked structure in the polymerizate which increases the polymerizate's hardness. Typically, the difunctional monomer represents from about 0 to about 5 weight percent, more typically from about 1 to about 4, e.g., about 1.5 to 2, weight percent, based on the total weight of the polymerizable polyol(allyl carbonate) composition. Customarily, the difunctional monomer is allyl methacrylate or allyl acrylate.

Polymerization of the polyol(allyl carbonate) composition may be accomplished by adding to the composition an initiating amount of material capable of generating free radicals, such as organic peroxy compounds and diazo compounds. Methods for polymerizing polyol(allyl carbonate) compositions are well known to the skilled artisan and any of those well known techniques may be used to polymerize the aforedescribed polymerizable composition. Suitable examples of organic peroxy compounds include: peroxymonocarbonate esters, such as tertiarybutylperoxy isopropyl carbonate; peroxydicarbonate esters, such as di(2-ethylhexyl) peroxydicarbonate, di(secondary butyl) peroxy dicarbonate and diisopropyl peroxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting resin polymerizate, such as diisopropyl peroxydicarbonate.

The amount of initiator used to initiate and polymerize the polyol(allyl carbonate) composition may vary and will depend on the particular initiation used. Only that amount that is required to initiate and sustain the polymerization reaction is required, i.e., an initiating amount. With respect to the preferred peroxy compound, diisopropyl peroxydicarbonate, typically between about 2 and about 3 parts of that initiator per 100 parts of the polymerizable composition (phm) may be used. More usually, between about 2.25 and about 2.60 parts of that initiator per 100 parts of polymerizable composition is used to prepare the polymerizate of the present invention. The amount of initiator and the consequent cure cycle should be adequate to produce a polymerizate having a 15 second Barcol hardness of at least 10, preferably, at least 12, e.g., 10 to 35. Typically, the cure cycle involves heating the polymerizable composition in the presence of the initiator from room temperature to about 105° C. over a period of about 17 hours. The surface of the cured matrix should not be so hard that imbibition of photochromic substances into the matrix by immersion or thermal transfer is inhibited or prevented if that method of incorporating the photochromic substance is used. In one embodiment, the matrix is slightly undercured to enhance permeation of the photochromic substance into the matrix.

Polymerizates obtained by polymerization of polyol(allyl carbonate) compositions will most preferably be transparent or optically clear so that articles prepared therefrom may be used for optical lenses such as plano and ophthalmic lenses, goggles, face shields, windows, automotive transparencies, e.g., windshields, T-roofs, sidelights and backlights and for aircraft transparencies, etc.

The present invention is more particularly described in the following examples, which are intended as illustrative only, since numerous modifications and variations therein will be apparent to those skilled in the art.

EXAMPLE 1

A polyol(allyl carbonate) polymerizable composition of 3000.0 grams composed of 68.5 weight percent diethylene glycol bis(allyl carbonate), 30 weight percent of Uvithane ® 893 urethane diacrylate and 1.5 weight percent allyl methacrylate was mixed with 2.45 phm (parts per hundred parts of monomer) of diisopropyl peroxy-dicarbonate. To this mixture was also added 250 ppm of 4-hydroxy anisole—a polymerization inhibitor and 200 ppm Zelec UN—a mold release agent. The polymerizable mixture was stirred at room temperature for 2 hours. A portion of this mixture was used to prepare ten 6-base plano lenses by filling glass molds separated by an 11.8 millimeter thick copoly(ethylene-vinyl acetate) gasket. The polymerizable composition was cured anaerobically by heating the filled mold slowly from about 44° C. to 105° C. over 17 hours. Two resulting representative plano lenses were subsequently treated in a air circulating oven for 3 hours at 130° C. and the luminous transmission and color coordinates measured on a color spectrometer (Spectrogard II). The values obtained for these two lenses are tabulated in Table I as samples Control-A and Control-B. The magnitude of the positive b* is proportional to yellowness. The higher the measured b* value, the more "yellow" is the material tested.

EXAMPLE 2

The procedure of Example 1 was used to prepare a polymerizable mixture of 1144.25 grams of the same polymerizable components in the same weight ratio as that described in Example 1. In addition, 0.5 weight percent of diethyl pyrocarbonate was added to the polymerizable mixture. A portion of this mixture was used to prepared ten 6-base plano lenses in the manner described in Example 1. Two representative resulting lenses were subsequently treated in a air circulating oven for 3 hours at 130° C. and the luminous transmission and color coordinates measured as described in Example 1. The values obtained for these two lenses are tabulated in Table I as Samples 1-A and 1-B.

EXAMPLE 3

A portion of the polymerizable mixture (500 grams) prepared in Example 2 and containing 0.5 weight percent diethyl pyrocarbonate was diluted with 500 grams of additional polymerizable mixture prepared as in Example 1. The resulting mixture contained 0.25 weight percent diethyl pyrocarbonate and was used to prepare ten 6-base plano lenses in the manner described in Example 1. Two of the resulting representative lenses were heat treated and tested in the manner described in Example 1. Values for these two lenses are tabulated in Table I as Samples 2-A and 2-B.

EXAMPLE 4

A portion of the solution (350 grams) prepared in Example 3 and containing 0.25 weight percent diethyl pyrocarbonate was further diluted with 350 grams of additional polymerizable mixture prepared as in Example 1, thereby to prepare a polymerizable composition containing 0.125 weight percent diethyl pyrocarbonate. This polymerizable mixture was used to prepare ten 6-base plano lenses in the manner described in Example 1. Two resulting representative lenses were heat treated and tested in the manner described in Example 1. Values obtained for these 2 lenses as tabulated in Table I as Samples 3-A and 3-B.

TABLE I

| Sample | Diethyl Pyrocarbonate (Conc. wt. %) | Luminous Transmission (Y, %) and Color Coordinates (a*, b*) | | | | | |
|---|---|---|---|---|---|---|---|
| | | Initial | | | Final[1] | | |
| | | Y (%) | a* | b* | Y (%) | a* | b* |
| Control-A | — | 91.5 | −0.7 | 2.6 | 89.7 | −1.1 | 6.0 |
| -B | — | 91.3 | −0.7 | 2.6 | 89.8 | −1.1 | 5.9 |
| 1-A | (0.50) | 91.6 | −0.8 | 2.8 | 90.9 | −1.0 | 4.2 |
| -B | (0.50) | 91.3 | −0.8 | 2.7 | 90.7 | −1.0 | 4.3 |
| 2-A | (0.25) | 91.3 | −0.8 | 2.8 | 90.6 | −1.0 | 4.3 |
| -B | (0.25) | 91.1 | −0.7 | 2.7 | 90.8 | −0.9 | 4.2 |
| 3-A | (0.125) | 91.2 | −0.7 | 2.7 | 90.7 | −0.9 | 4.2 |
| -B | (0.125) | 91.4 | −0.7 | 2.7 | 90.6 | −1.0 | 4.3 |

[1]After heating for three hours at 130° C.

The data of Table I shows that the addition of a small amount, e.g., 0.125 weight percent, of diethyl pyrocarbonate resulted in a lens that is significantly less yellow after heat treatment than the control lens.

Although the present invention has been described with reference to the specific details of particular embodiments thereof, it is not intended that such details be regarded as limitations upon the scope of the invention except insofar as and to the extent that they are included in the accompanying claims.

What is claimed is:

1. A polyol(allyl carbonate) composition comprising
   (a) a copolymerizable mixture of:
      (1) from about 55 to about 90 weight percent of polyol(allyl carbonate),
      (2) from about 10 to about 40 weight percent of aliphatic polyurethane having ethylenic unsaturation at its terminal ends, and
      (3) from about 0 to about 5 weight percent of a difunctional monomer selected from the group consisting of allyl methacrylate and allyl acrylate, and
   (b) from about 0.01 to about 0.5 weight percent, based on the weight of the copolymerizable mixture, of dialkyl pyrocarbonate represented by the graphic formula:

R—O—C(O)—O—C(O)—O—R, wherein R is selected from the group consisting of $C_1$-$C_{12}$ alkyl and $C_6$-$C_{10}$ cycloalkyl.

2. The composition of claim 1 wherein R is a $C_2$-$C_4$ alkyl.

3. The composition of claim 1 wherein R is cyclohexyl or tertiarybutyl cyclohexyl.

4. The composition of claim 1 wherein the polyol(allyl carbonate) composition contains from about 0.05 to about 0.15 weight percent of dialkyl pyrocarbonate.

5. The composition of claim 2 wherein the polyol(allyl carbonate) composition contains from about 0.05 to about 0.15 weight percent of dialkyl pyrocarbonate.

6. The composition of claim 5 wherein the dialkyl pyrocarbonate is diethyl pyrocarbonate.

7. The composition of claim 1 wherein the polyol(allyl carbonate) is diethylene glycol bis(allyl carbonate).

8. The composition of claim 1 wherein the aliphatic polyurethan is an aliphatic polyurethane diacrylate.

9. The composition of claim 1 wherein the aliphatic polyurethane is represented by the expression:

D—R″—B—A—B—R″—D wherein:
   (a) D represents the terminal functional group containing ethylenic unsaturation and is selected from members of the group consisting of $CH_2$=$C(R_1)$—$C(O)O$—, $CH_2$=$CH$—$CH_2$—$NH$—$C(O)O$— and $CH_2$=$CH$—$CH_2$—$O$—$C(O)O$—, wherein $R_1$ is hydrogen or methyl,
   (b) R″ represents a bivalent $C_1$-$C_{10}$ alkylene,
   (c) B represents an aliphatic bis carbamate moiety originating from the corresponding aliphatic diisocyanate, and
   (d) A represents the residue of a saturated aliphatic diol, polyether diol, polycarbonate diol or polyester diol.

10. The composition of claim 1 wherein the polyol(allyl carbonate) is diethylene glycol bis(allyl carbonate), the aliphatic polyurethane is a diacrylate terminated polyesterurethan, and the difunctional monomer is allyl methacrylate.

11. The composition of claim 2 wherein the polyol(allyl carbonate) is diethylene glycol bis(allyl carbonate), the aliphatic polyurethane is a diacrylate terminated polyesterurethan, and the difunctional monomer is allyl methacrylate.

12. The composition of claim 11 wherein the dialkyl pyrocarbonate is diethyl pyrocarbonate.

13. The composition of claim 12 wherein the polyester polyurethane has a molecular weight of from about 900 to about 1300.

14. A polymerizate prepared from the polyol(allyl carbonate) composition of claim 1.

15. A polymerizate prepared from the polyol(allyl carbonate) composition of claim 6.

16. A polymerizate prepared from the polyol(allyl carbonate) composition of claim 10.

17. A polymerizate prepared from the polyol(allyl carbonate) composition of claim 11.

18. A polymerizate prepared from the polyol(allyl carbonate) composition of claim 12.

19. The polymerizate of claim 18 wherein the polymerizate is a lens.

20. The polymerizate of claim 19 wherein the polyester polyurethane has a molecular weight of from about 900 to about 130.

* * * * *